May 19, 1964 C. B. NORDSTROM 3,133,985
CABLE SPREADER ASSEMBLY AND BRACING MEMBER
Filed Aug. 15, 1962
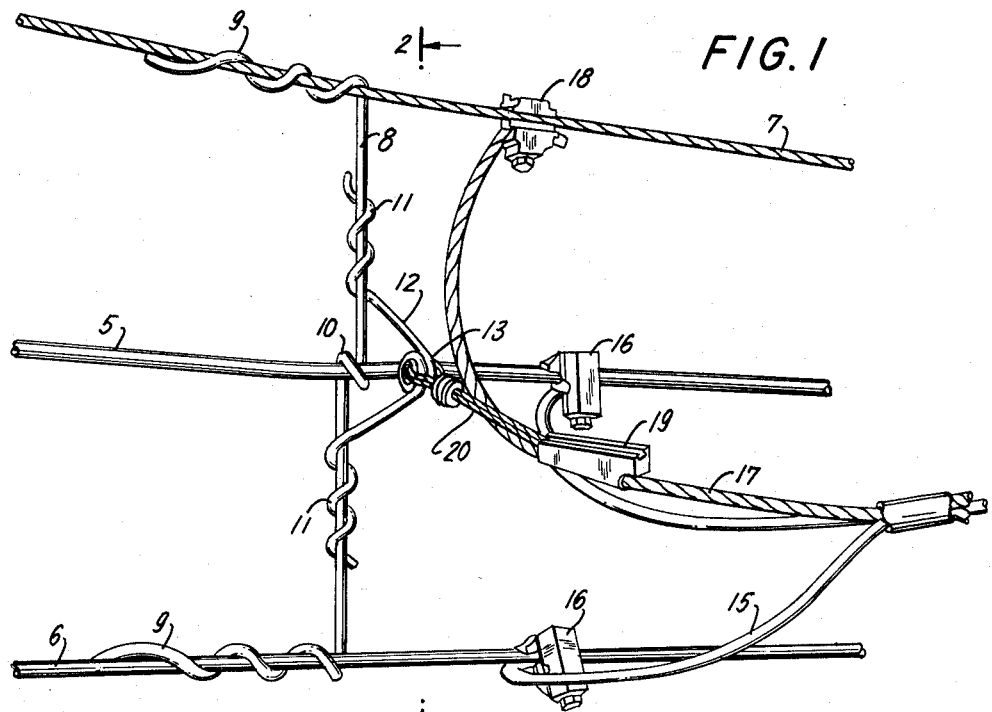
FIG. 1
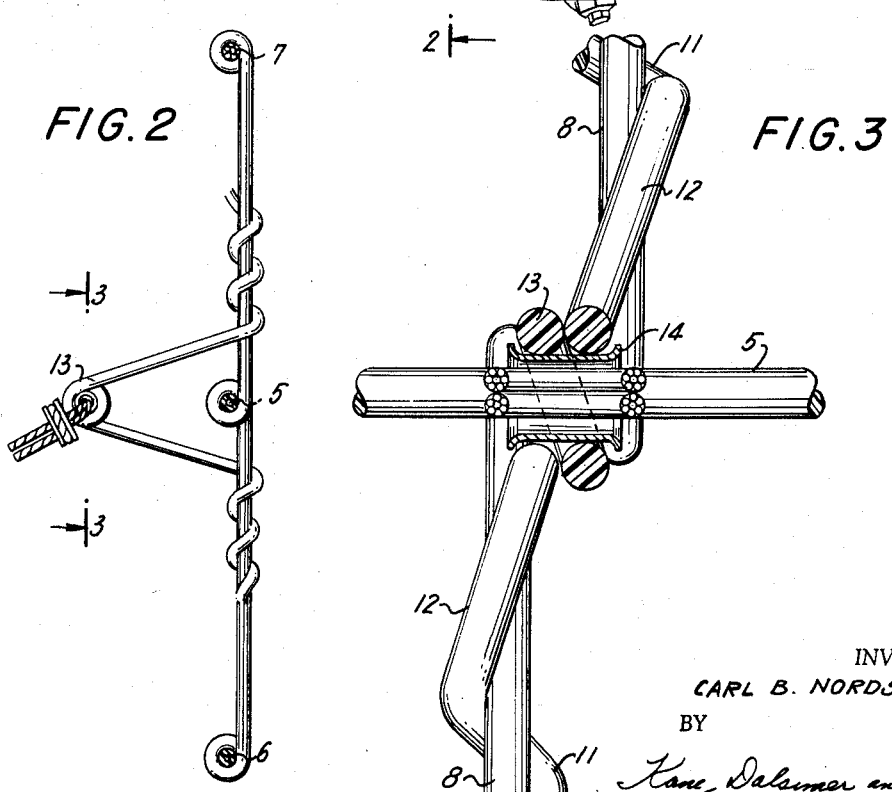
FIG. 2
FIG. 3
INVENTOR.
CARL B. NORDSTROM
BY
Kane, Dalsimer and Kane
ATTORNEYS

UNITED STATES PATENT OFFICE 3,133,985
Patented May 19, 1964

3,133,985
CABLE SPREADER ASSEMBLY AND
BRACING MEMBER
Carl B. Nordstrom, Kingston, N.Y., assignor to Fargo
Mfg. Company, Inc., Poughkeepsie, N.Y., a corporation of New York
Filed Aug. 15, 1962, Ser. No. 217,203
3 Claims. (Cl. 174—43)

This invention relates to a structurally and functionally improved spreader assembly for use with cables as well as a bracing member to be employed in such an assembly.

So employed, the main portions of the spreader will be rigidified to an extent such that they will not flex or bend beyond predetermined limits. Also, a messenger cable forming a part of a tap-off connection with main transmission cables will be supported in a highly desirable manner.

Still another object is that of furnishing a structure which will be relatively simple and inexpensive aside from the fact that the parts may be grouped together with minimum difficulty by a linesman and similarly diassemble if necessary.

With these and other objects in mind, reference is had to the attached sheet of drawings illustrating one practical embodiment of the invention and in which:

FIG. 1 is a perspective view of the assembly in applied position;

FIG. 2 is a transverse sectional view taken along the line 2—2 in the direction of the arrows as indicated in FIG. 1; and FIG. 3 is a fragmentary sectional front view taken along the line 3—3 in the direction of the arrows as indicated in FIG. 2 and showing the parts in enlarged scale.

Referring primarily to FIGS. 1 and 2 the numerals 5 and 6 indicate current transmitting cables. It is necessary that these cables be maintained in separated condition. Also, it is frequently desirable or essential that these cables have a supported relationship with respect to an adjacent messenger cable 7. To achieve this result it has been customary to employ a spreader coupling these cables to each other and maintaining a predetermined spacing between the same.

A suitable spreader has been illustrated and includes a body 8 forming a rod with its opposite ends disposed in the form of coils 9 between which its body defines a loop 10. Coils 9 define convolutions, the inner surfaces of which have a diameter slightly less than the diameter of cables 6 and 7. Similarly, loop 10 defines by its inner edge surface a diameter less than that of cable 5 This spreader is formed of suitable insulating material such as, for example, any desirable type of plastic or structure which is given a permanent "set" to maintain the dimensions and configurations of coils 9 and loop 10.

The spreader may be applied to cable 5 by swinging the arm portions of body 8 in directions such that loop 10 is enlarged or "opened" so that it may readily receive cable 5. Thereupon, these arm portions are released and under the normal resiliency of the rod providing the spreader the loop will close around that cable. Thereupon, the outer ends of coils 9 are manipulated so that they are caused to encircle cables 6 and 7. So positioned they will be maintained against displacement because of the gripping characteristics imparted to the coils and loops as a consequence of the reduced diameters involved. A spreader of this type has in certain instances proved to be unsatisfactory because, under high wind conditions with consequent swaying of the cables, the body 8 due to its resiliency has flexed to an undesirable extent, especially where a loop portion such as 10 has been included. Undesirable flexing may especially come into being where a "tap-off" exists. Accordingly, the present invention contemplates the provision of a bracing member which may be attached to spreaders already in existence or included in new spreader assemblies. In either event it will maintain the portions of the spreader from flexing beyond predetermined limits. Also, it will furnish an accessory portion for the proper securing of parts involved in a tap-off connection.

Such bracing member includes a rod-shaped body similar to body 8. Coil portions 11 define the ends of this body. The convolutions of these coils should have diameters smaller than that of body 8. Accordingly, as they are caused to encircle that body they will constrictively engage it to prevent axial movement of the bracing member along the same. The central portion of this member involves a spring which, as shown, includes outwardly and centrally extending parts 12 converging towards each other and coupled by an integral loop portion 13 as in FIG. 3. A grommet 14 has these loops encircling it and is retained against displacement by the coil of the loop.

It is apparent that the bracing member involving parts 11, 12 and 13 may readily be applied to the body 8 of the spreader. So applied, its spring portion will extend at angles such that it will properly resist swinging of coils 9 with respect to each other and especially such as might come into being where the spreader involves a loop 10.

Now, considering the tap-off which will frequently be embodied in a grouping of parts such as this, it will be noted that it includes current transmitting cables 15 electrically connected one to each of cables 5 and 6 by suitable clamps 16. A messenger cable such as 17 will usually be included in the tap-off grouping. Allowing for suitable slack the end of this messenger cable may be connected by, for example, a clamp 18 with messenger cable 7. To limit relative movements of the parts and not throw undue strain on messenger cable 7 a "dead end" type connector 19 may be coupled with messenger cable 17 and include a suitable flexible member 20 which is passed through loops 13 and grommet 14 (if the latter be employed). It is thus obvious that the tap-off may be properly established and will be maintained against separation from the transmitting cables. Also that a yielding coupling is furnished by the connection between messenger cable 17 and loop or loops 13 which will serve to cushion strains even under severe climatic conditions.

Thus, among others, the several objects of the invention as specifically aforenoted are achieved. Obviously, numerous changes in construction and rearrangements of the parts may be resorted to without departing from the spirit of the invention as defined by the claims.

What is claimed is:

1. A cable spreader and bracer assembly including in combination a flexible spreader rod of insulating material, a central portion of said spreader rod, a first helical coil formed by an end of said spreader rod with its axis at an angle to said central portion, a second helical coil formed by the remaining end of said spreader rod with its axis also at an angle to said central portion, a flexible bracer rod of insulating material, a third helical coil formed by an end of said bracer rod having convolutions embracing said central portion, a fourth helical coil formed by the remaining end of said bracer rod having convolutions embracing said central portion in spaced relation with said third coil and a spring portion of said bracer rod between said third and fourth coils resisting relative movement of said third and fourth coils and flexing of said spreader rod.

2. In an assembly as defined in claim 1, said first and second coils having axes lying in the same plane and each having convolutions constructed and arranged to embrace cables therein.

3. In an assembly as defined in claim 1, said third and fourth coils having the same axis and said spring portion comprising a loop to receive a cable therein.

References Cited in the file of this patent

UNITED STATES PATENTS

| | | |
|---|---|---|
| 534,169 | Myers | Feb. 12, 1895 |
| 2,202,538 | Selquist | May 28, 1940 |
| 2,421,286 | Pyle | May 27, 1947 |
| 2,825,751 | Flower | Mar. 4, 1958 |
| 2,941,029 | Stoeckel | June 14, 1960 |

OTHER REFERENCES

"Second Spacer," Fargo Manufacturing Co., Inc. Advertisement, Electrical World, vol. 157, No. 8, Feb. 19, 1692, page 72.